3,009,005
CHEMICAL PROCESS
Gerson S. Schaffel, Old Westbury, N.Y., assignor to Scientific Design Company, Inc., a corporation of Delaware
Filed June 12, 1959, Ser. No. 819,937
6 Claims. (Cl. 260—681)

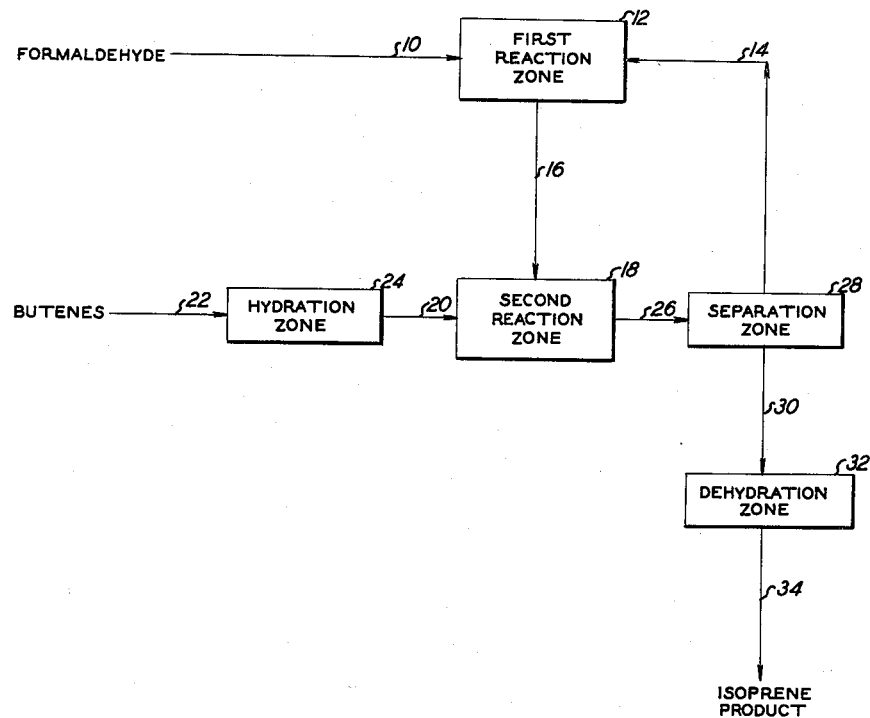

This invention relates to a process for producing isoprene and more particularly concerns a process for the production of isoprene under such conditions as to obtain side products that can be recycled and consumed in the process so that only the desired product is obtained in the overall process.

It is an important object of the present invention to provide an improved process for producing isoprene comprising the steps of reacting a member selected from the group consisting of methyl isopropenyl ketone and 2-acetyl-1-propanol with sec-butyl alcohol, dehydrating the reaction product to form isoprene, and recovering the isoprene.

Another object of the present invention is to provide an improved process for producing isoprene comprising the steps of contacting methyl isopropenyl ketone with sec-butyl alcohol to convert methyl isopropenyl ketone to methyl isopropenyl carbinol, dehydrating methyl isopropenyl carbinol to form isoprene and recovering the isoprene.

Another object of the present invention is to provide an improved process for producing isoprene comprising contacting methyl isopropenyl ketone with sec-butyl alcohol to form methyl isopropenyl carbinol and methyl ethyl ketone, reacting said methyl ethyl ketone with formaldehyde to obtain methyl isopropenyl ketone, utilizing said methyl isopropenyl ketone for reaction with additional amounts of sec-butyl alcohol to produce additional methyl isopropenyl carbinol, dehydrating methyl isopropenyl carbinol to form isoprene, and recovering said isoprene.

Another object of the present invention is to provide an improved method for producing isoprene comprising the steps of reacting formaldehyde with methyl ethyl ketone to obtain methyl isopropenyl ketone, contacting the methyl isopropenyl ketone with sec-butyl alcohol obtained by the hydration of butenes to produce methyl isopropenyl carbinol and methyl ethyl ketone, utilizing the methyl ethyl ketone thus formed for reaction with additional formaldehyde, dehydrating methyl isopropenyl carbinol to form isoprene and recovering said isoprene.

Thus the present invention in one aspect provides a method of producing isoprene, utilizing formaldehyde and butenes as starting materials, in which isoprene is substantially the sole product.

Other objects, features, and advantages of the present invention will be apparent to those skilled in the art from the following detailed description of certain embodiments thereof taken in conjunction with the drawing in which:

The single figure illustrates a flow diagram of the process embodying the principles of the present invention.

According to the invention the above objects may be accomplished in an improved isoprene manufacturing process. In this process methyl isopropenyl ketone is converted into methyl isopropenyl carbinol by contact with sec-butyl alcohol, resulting in a mixture of methyl ethyl ketone and methyl isopropenyl carbinol. Methyl ethyl ketone is separated and reacted with formaldehyde to form additional methyl isopropenyl ketone for further reaction with additional amounts of sec-butyl alcohol. After the methyl isopropenyl ketone is treated with sec-butyl alcohol, the desired reaction product, methyl isopropenyl carbinol, is removed for subsequent dehydration to form isoprene, and the side product, methyl ethyl ketone, is recycled in the process for conversion to methyl isopropenyl ketone. Thus, the recycling of methyl ethyl ketone is continuously performed, resulting in the continuous production of isoprene with practically no waste products to speak of.

Referring to the drawing, formaldehyde is introduced into the process through line 10 and passes into a first reaction zone or chamber 12 where it is treated with methyl ethyl ketone supplied by recycle line 14 to produce methyl isopropenyl ketone. This reaction is satisfactorily conducted using alcoholic KOH at temperatures between 25° C. and 95° C. at autogenous pressures, for a sufficient period, conveniently 1 hour, until all of the formaldehyde is consumed.

It will be realized that the reaction of methyl ethyl ketone and formaldehyde to form methyl isopropenyl ketone can be considered as embracing formation of the intermediate compound 2-acetylpropanol-1 which loses a molecule of water to yield methyl isopropenyl ketone.

To achieve the conversion of methyl isopropenyl ketone to methyl isopropenyl carbinol, methyl isopropenyl ketone from reaction chamber 12, emanating from outlet line 16, is taken to a second reaction zone 18 where it is reacted with sec-butyl alcohol. This is preferably accomplished by introducing sec-butyl alcohol through conduit 20 into the reaction zone 18. In the preferred practice of the invention the sec-butyl alcohol is derived from the hydration of butenes, butene-1 or -2, or a combination or both, being equally suitable for this purpose.

Illustrated herein, butene-1 and/or -2, flowing in inlet conduit 22, is hydrated to sec-butyl alcohol in a hydration zone or vessel 24 from whence it passes through conduit 20 into the isoprene manufacturing operation of the invention. The flow rate of sec-butyl alcohol is suitably regulated so that substantially all of the sec-butyl alcohol entering reaction zone 18 reacts with substantially all of the methyl isopropenyl ketone supplied through outlet line 16 under such conditions that a so-called "hydrogen transfer" mechanism occurs. By this means the alcoholic hydrogen atom in the sec-butyl alcohol is transferred to the carbonyl oxygen of the methyl isopropenyl ketone to transform it into methyl isopropenyl carbinol, and the sec-butyl alcohol is in turn dehydrated to methyl ethyl ketone.

The desired operating conditions in the second reaction zone are about 200°–500° C. at about atmospheric pressure, with 350°–400° C. being preferred.

The product from the reaction zone 18, consisting predominantly of a mixture of methyl isopropenyl carbinol and methyl ethyl ketone, is sent via a connecting line 26 through a separation zone or distillation column 28 from which methyl ethyl ketone is taken off as a liquid and separated methyl isopropenyl carbinol leaves through a discharge pipe 30. The pipe 30 terminates in a dehydration zone or chamber 32 in which the dehydration of methyl isopropenyl carbinol over alumina or anhydrous magnesium sulfate or other suitable dehydrating agent yields isoprene. Thereafter the isoprene is recovered through a tube 34.

As an important feature of the present invention there is provided a cyclic system for continuously recovering the side reaction products of the present process and recycling them in the process. This is accomplished by recovering methyl ethyl ketone in the distillation column 28 and returning it as feed stock to the reaction chamber 12 via the recycle line 14.

By the use of suitable flow rates, sequence time control apparatus, solenoid valves and other control equipment, all the steps described above may be carried out automatically if so desired.

In the modification of the invention, the reaction of formaldehyde and methyl ethyl ketone is conducted under suitable conditions in the first reaction zone 12 to yield 2-acetyl-1-propanol. This material is led through line 16 into the second reaction zone where it reacts with sec-butyl alcohol according to the hydrogen transfer mechanism previously explained to form methyl ethyl ketone plus 2-methyl-1,3-butanediol.

It should be noted that the 2-acetyl-1-propanol formed by the reaction of formaldehyde and methyl ethyl ketone, when treated with sec-butyl alcohol in the presence of a hydrogen transfer catalyst, may as an intermediate step undergo an intramolecular hydrogen transfer, resulting in 2-methyl-3-hydroxy butyraldehyde, $$CH_3-CO-CH-CH_2OH \longrightarrow CH_3-CHOH-CH-CHO$$
$$\phantom{CH_3-CO-}CH_3 \phantom{xxxxxxxxxxxxxxxxxx} CH_3$$

the latter compound then undergoing an intermolecular hydrogen transfer with sec-butyl alcohol to give 2-methyl-1,3-butanediol and methyl ethyl ketone.

$$CH_3-CHOH-CH-CHO+CH_3-CHOH-CH_2-CH_3 \longrightarrow$$
$$\phantom{xxxxxx}CH_3$$
$$CH_3-CHOH-CH-CH_2OH+CH_3-CO-CH_2-CH_3$$
$$\phantom{xxxxxxxx}CH_3$$

The reaction products pass through line 26 into the separation zone 28 where methyl ethyl ketone is separated and utilized for reaction with additional amounts of formaldehyde in the first reaction zone 12. The remaining diol passes through line 30 into the dehydration zone 32 where dehydration occurs in which two molecules of water are extracted, resulting in the formation of isoprene.

The following examples illustrate the process of producing isoprene according to the invention.

*Example 1*

(a) *Reaction of methyl ethyl ketone with formaldehyde*

A suspension of paraformaldehyde (30 g.) in anhydrous methyl ethyl ketone (350 g.) is stirred at 40°–45° C. To this mixture is added 2.5 ml. of 0.5 N alcoholic KOH. The reaction of methyl ethyl ketone with formaldehyde proceeds according to the following equation:

$$CH_3-CO-CH_2-CH_3+HCHO \longrightarrow CH_3-CO-CH-CH_2OH$$
$$\phantom{xxxxxxxxxxxxxxxxxxxxxxxxxxxx}CH_3$$

The reaction mixture is cooled to maintain the temperature at 45° C. for approximately 1 hour, until all of the formaldehyde is consumed, as indicated by a negative test with Tollen's reagent. The mixture is neutralized with 1 ml. of 2 N acetic acid in methyl ethyl ketone and the excess methyl ethyl ketone is removed by distillation at atmospheric pressure, followed by distillation at reduced pressure sufficient to maintain a maximum pot temperature of 80° C.

At increased ratios of methyl ethyl ketone to HCHO the yield of 2-acetylpropanol-1 increases as follows:

| Methyl ethyl ketone/HCHO | Mol percent yield of 2-acetylpropanol-1 |
|---|---|
| 3 | 75 |
| 5 | 84 |
| 10 | 88 |
| 20 | 93 |

(b) *Dehydration*

After removal of the excess methyl ethyl ketone, to the residue is added 5 ml. conc. $H_3PO_4$, 0.5 g. copper powder, and 0.5 g. hydroquinone. The mixture is heated to 120°–130° C. under nitrogen, with the removal of $H_2O$. The product after drying with anhydrous $MgSO_4$ is distilled under vacuum (36°–37° C. @ 100 mm. Hg).

Dehydration of the 2-acetylpropanol-1 proceeds as follows:

$$CH_3COCH-CH_2OH \longrightarrow CH_3COC=CH_2+H_2O$$
$$\phantom{xxx}CH_3 \phantom{xxxxxxxxxxxxxxx}CH_3$$

The molal yield of methyl isopropenyl ketone is about 90% of theoretical.

(c) *Hydrogen exchange*

Equimolar quantities of methyl isopropenyl ketone and sec-butanol are mixed and passed over anhydrous MgO at 300° C. according to the following reaction:

$$CH_3COC=CH_2+CH_3CHOHCH_2CH_3 \longrightarrow$$
$$\phantom{xxx}CH_3$$
$$CH_3COCH_2CH_3+CH_3CHOHC=CH_2$$
$$\phantom{xxxxxxxxxxxxxxxxxxxxxxxxx}CH_3$$

Conversion is essentially 100% and the yield of methyl isopropenyl carbinol is about 90% (molal basis). The resulting methyl ethyl ketone is recycled to step (a) for reaction with HCHO.

(d) *Dehydration*

The methyl isopropenyl carbinol is passed over anhydrous $MgSO_4$ in the vapor phase at 260°–300° C. to react as follows:

$$CH_3CHOHC=CH_2 \longrightarrow CH_2=CH-C=CH_2+H_2O$$
$$\phantom{xxxxx}CH_3 \phantom{xxxxxxxxxxxxxxxxx}CH_3$$

The yield of isoprene is 85–90% (molal basis).

EXAMPLE 2

Example 1 is repeated, maintaining substantially the same conditions, with the exception that the dehydration step (b) is eliminated. Instead, the intermediate, 2-acetyl-1-propanol, is converted by a hydrogen exchange mechanism, utilizing sec-butyl alcohol in a manner similar to step (c) to form 2-methyl-1,3-butanediol and methyl ethyl ketone. The resulting methyl ethyl ketone is recycled to step (a) for reaction with formaldehyde. The 2-methyl-1,3-butanediol is then dehydrated to form isoprene. There is no appreciable difference in the yields obtained by the two methods.

It will be realized that in the above examples, the process conditions involved in the reaction of methyl ethyl ketone with formaldehyde will vary, but generally this step is carried out at 25°–95° C. at autogenous pressure and desirably between 35°–70° C. The preferred range is 40°–50° C. Under these conditions the ratio of methyl ethyl ketone to formaldehyde is broadly maintained between 25:1 and 1:25. A desirable range of the ratio of methyl ethyl ketone to formaldehyde is 10:1, with 3:1 being preferred. It will be apparent that instead of alcoholic KOH, NaOH, $Ba(OH)_2$ or any basic substance having a dissociation constant of at least $K_b=10^{-3}$, in equivalent amounts, such as alkaline earth oxides or hydroxides, resins or clays, or organic amine hydroxides, as for example, trimethylbenzylammonium hydroxide (and substances giving a strongly basic reaction under conditions of the reaction) may be employed.

Neutralization with acetic acid in step (a) can also be carried out with any acidic substance in equivalent amount to the base used resulting in an essentially neutral solution.

While the dehydration of 2-acetylpropanol-1 can proceed at temperatures between 100° and 200° C. at atmospheric pressure, a desirable temperature is 105°–170° C., with 110°–130° C. being preferred.

The amount of phosphoric acid is generally in the amount of 0.5–10%, based on the alcohol, preferably 5%. The copper powder is generally used in the amount between 0.25–0.75%. $H_3PO_4$ can be replaced with sulfuric acid, or activated alumina, or a silica alumina mixture. The hydroquinone can be replaced with tannic acid or pyrogallol. Similarly the nitrogen atmosphere employed in the examples can be any other inert gaseous atmosphere such as argon, helium or carbon dioxide.

The reaction conditions specified in the hydrogen exchange step can also be varied somewhat. Thus, the temperature at atmospheric pressure is generally 200°–500° C. with 250°–425° C. being desirable, and 350°–400° C. being preferred. Instead of MgO, magnesium-zinc oxide combinations, calcium oxide, zinc oxide, lithium oxide, sodium oxide and cadmium oxides can be used. Efficiencies of these oxides are improved by supporting them on activated alumina. MgO, however, is preferred.

In the final steps, dehydration agents other than $MgSO_4$ may be employed, as for example activated alumina, heavy metal fluoroborates (Zn, Ni, Fe, Cu, Pb, Cr), phospho- and silico-tungates of metals such as zinc, copper, nickel, molybdenum, titanium, thorium, tantalum, and mixtures thereof, as well as cadmium metaphosphate, chrome-phosphoric acid or $SiO_2$, $Al_2O_3$—$WO_3$, and cobalt-thoria on kieselguhr.

The dehydration zone is operated at temperatures from 150°–500° C. at 0.1–20 atm. The temperature and pressure are desirable between 225°–400° C. at 1–10 atm., with 250°–350° C. at 1–5 atm. being preferred.

From the above description it will be seen that the present invention provides a unique process for producing isoprene by inter-reaction of sec-butyl alcohol with a member selected from the group consisting of 2-acetyl-1-propanol and methyl isopropenyl ketone and subsequently dehydrating the reaction product to form isoprene. An obvious advantage of the present invention is that the side reaction product, methyl ethyl ketone can be reacted with formaldehyde and recycled in the process. The recycling of methyl ethyl ketone offers manufacturing savings because it produces more isoprene product per unit of weight of starting materials. In addition, the recycling of methyl ethyl ketone reduces the wastage of the reactant materials which in some instances are very valuable.

While in the foregoing there has been shown and described the preferred embodiments of this invention, it is to be understood that modifications and variations may be effected without departing from the spirit and scope of the invention.

What is claimed is:

1. A process for producing isoprene comprising the steps of reacting formaldehyde with methyl ethyl ketone to obtain methyl isopropenyl ketone, contacting the methyl isopropenyl ketone with sec-butyl alcohol under conditions such that a hydrogen transfer mechanism is effected to produce respectively methyl isopropenyl carbinol and methyl ethyl ketone, recycling the methyl ethyl ketone formed by said hydrogen transfer mechanism for reaction with additional formaldehyde, dehydrating the methyl isopropenyl carbinol to form isoprene, and recovering said isoprene.

2. A process for producing isoprene comprising the steps of reacting formaldehyde with methyl ethyl ketone to obtain methyl isopropenyl ketone, contacting the methyl isopropenyl ketone with sec-butyl alcohol, obtained by the hydration of butene, under conditions such that a hydrogen transfer mechanism is effected to produce respectively methyl isopropenyl carbinol and methyl ethyl ketone, recycling the methyl ethyl ketone formed by said hydrogen transfer mechanism for reaction with additional formaldehyde, dehydrating the methyl isopropenyl carbinol to form isoprene, and recovering said isoprene.

3. A process for producing isoprene comprising the steps of reacting a member selected from the group consisting of methyl isopropenyl ketone and 2-acetyl-1-propanol with sec-butyl alcohol under such conditions that a hydrogen transfer mechanism is effected to produce respectively (1) an alcohol containing one hydroxy group and methylethyl ketone and (2) an alcohol containing two hydroxy groups and methyl ethyl ketone, reacting said methyl ethyl ketone with formaldehyde to obtain said member, utilizing said member for reaction with additional amounts of sec-butyl alcohol, dehydrating said alcohol prepared by the said reaction of said member with sec-butyl alcohol to form isoprene, and recovering said isoprene.

4. A process for producing isoprene comprising the steps of reacting a member selected from the group consisting of methyl isopropenyl ketone and 2-acetyl-1-propanol with sec-butyl alcohol to yield a reaction product containing in part methyl ethyl ketone, separating and reacting said methyl ethyl ketone with formaldehyde to form said member and recycling same, dehydrating the remainder of said reaction product to form isoprene, and recovering said isoprene.

5. A process according to claim 4, in which said dehydration step includes the removal of 2 mols of water for each mol of reaction product dehydrated.

6. A process according to claim 4, which includes the prior removal of 1 mol of water per mol of member reacted with sec-butyl alcohol and the subsequent removal of 1 mol of water for each mol of reaction product dehydrated.

References Cited in the file of this patent

UNITED STATES PATENTS

| 1,026,691 | Merling et al. | May 21, 1912 |
| 1,094,223 | Kyriakides | Apr. 21, 1914 |
| 2,075,204 | Joshua et al. | Mar. 30, 1937 |

FOREIGN PATENTS

| 65,211 | Netherlands | Feb. 15, 1950 |

OTHER REFERENCES

Colonge et al.: "Chemical Abstracts," vol. 52, (1948), pg. 2233.